June 27, 1950 J. C. O'BRIEN 2,513,249

BY-PASS CONDENSER STRUCTURE FOR RADIO AMPLIFIERS

Filed Dec. 4, 1948 2 Sheets-Sheet 1

INVENTOR.
J. C. O'Brien,
BY Neil D. Preston,
HIS ATTORNEY.

June 27, 1950 J. C. O'BRIEN 2,513,249

BY-PASS CONDENSER STRUCTURE FOR RADIO AMPLIFIERS

Filed Dec. 4, 1948 2 Sheets-Sheet 2

INVENTOR.

BY J. C. O'Brien,

Neil W. Preston,

HIS ATTORNEY.

Patented June 27, 1950 2,513,249

UNITED STATES PATENT OFFICE 2,513,249

BY-PASS CONDENSER STRUCTURE FOR RADIO AMPLIFIERS

John C. O'Brien, Rochester, N. Y., assignor to General Railway Signal Company, Rochester, N. Y.

Application December 4, 1948, Serial No. 63,571

2 Claims. (Cl. 250—16)

This invention relates to electronic circuits and more particularly to electronic circuits in which high frequencies are involved and in which it is essential to provide low impedance, by-pass paths to ground for currents of those frequencies.

In many conventional electronic circuit organizations, such as amplifiers, detectors, and discriminators, only a very small amount of feedback between the various stages is required to cause the circuit organization to go into oscillation and thereby adversely affect its operation. In the use of by-pass condensers of the prior art, it is frequently necessary to use relatively long wires or leads for the electrical connections from the various tube elements, transformer windings, and the like to the by-pass condensers. Although the inductance of these leads is very small, usually in the order of a few microhenries, the reactance of these leads at the high frequencies involved becomes considerable and results in ineffective by-passing of those frequencies. In addition, decreased attenuation of these very high frequencies is caused by the lumping of the by-pass capacitance into a single by-pass condenser as will presently be made clear.

In many types of electronic apparatus, as in radio receiving organizations for example, a large number of by-pass condensers are required. Thus, an important requirement of by-pass condensers is that they occupy a minimum of space and thus contribute to reducing the over-all volume of the radio receiver. Also, many by-pass condenser assemblies, and especially feed-through condenser assemblies of which the condenser assembly of the present invention is a type, require a large number of different parts and thus add greatly to the cost of the condensers.

In view of these adverse effects of the conventional by-pass condenser and also of feed-through, by-pass condensers of the prior art, it is proposed, in accordance with the present invention, to provide an improved by-pass condenser assembly which not only provides better attenuation of radio frequencies and requires a minimum of space, but which may be manufactured at a lower cost.

Generally speaking, and without attempting to define the exact scope of the present invention, it is proposed to provide a stacking of plates which are good conductors of electricity with sheets of a dielectric material interposed between the various conducting plates in such a manner as to provide a multiplicity of by-pass condensers in a single assembly. In addition, the particular design of the plates and dielectric sheets, in conjunction with the method of assembly, is such as to reduce to a minimum the number of differently shaped plates required, to reduce the length of the leads from the tube elements, transformer windings, and the like to the by-pass condensers, and to reduce the over-all volume of the complete condenser assembly.

Various other objects, characteristics and attributes of the present invention will be in part apparent from the drawings, and in part pointed out, as the description of the invention progresses.

The accompanying drawings illustrate one specific embodiment of the invention for one particular field of application, the parts being illustrated in a manner to facilitate an understanding of the nature of the invention rather than to show the exact proportion of parts and structural details preferably employed in practice.

In these drawings.

Figures 1, 2, 3, 9A, 9B, 10A, 10B:
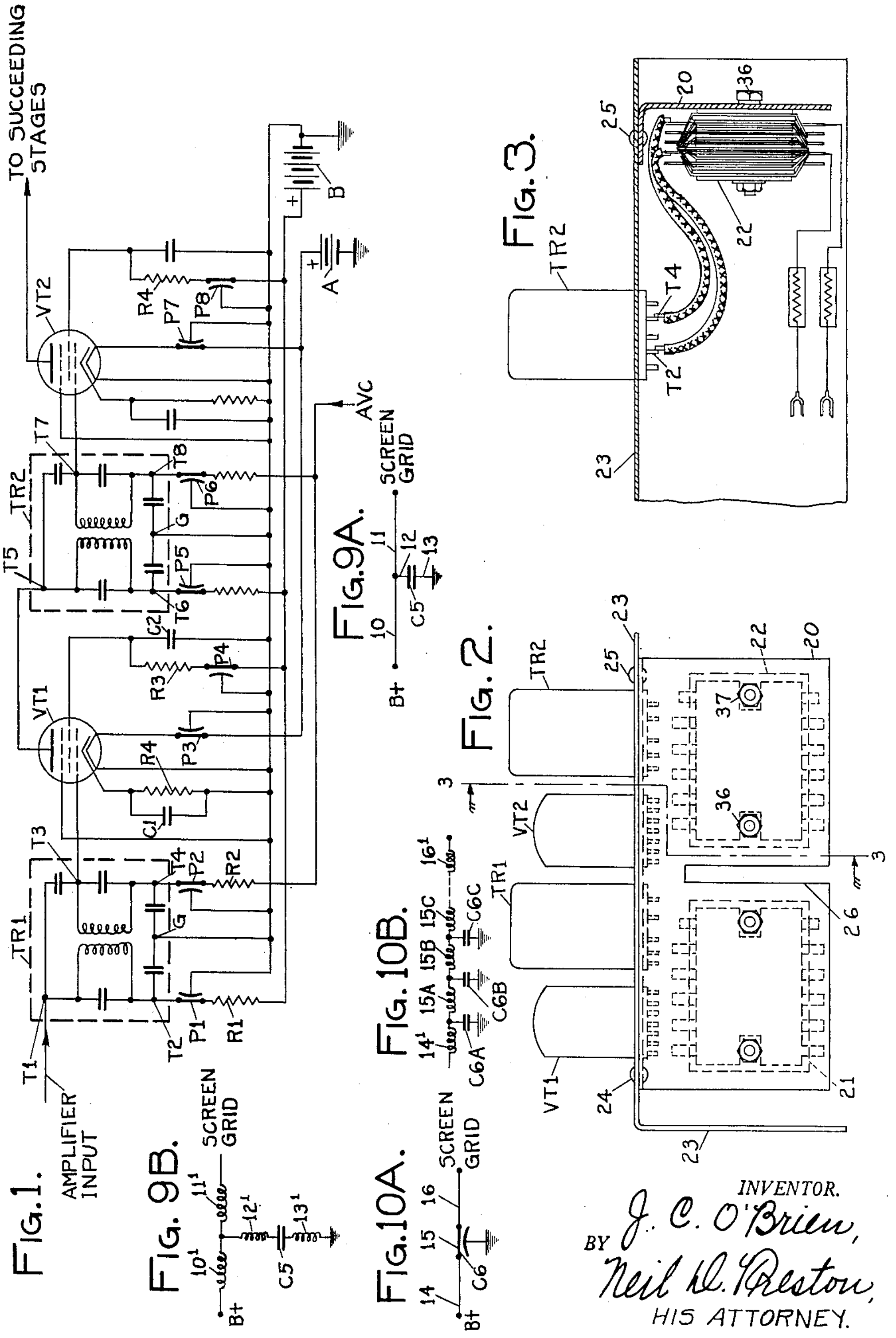
Fig. 1 illustrates in a diagrammatic manner one particular type of circuit arrangement employing by-pass condensers.
Fig. 2 is a side view of one particular arrangement of several of the circuit components of Fig. 1 in conjunction with an assembly of by-pass condensers.
Fig. 3 is a sectional view of part of Fig. 2 further illustrating the relative arrangement of by-pass condensers and circuit elements.
Figures 4, 5, 6, 7, 8:
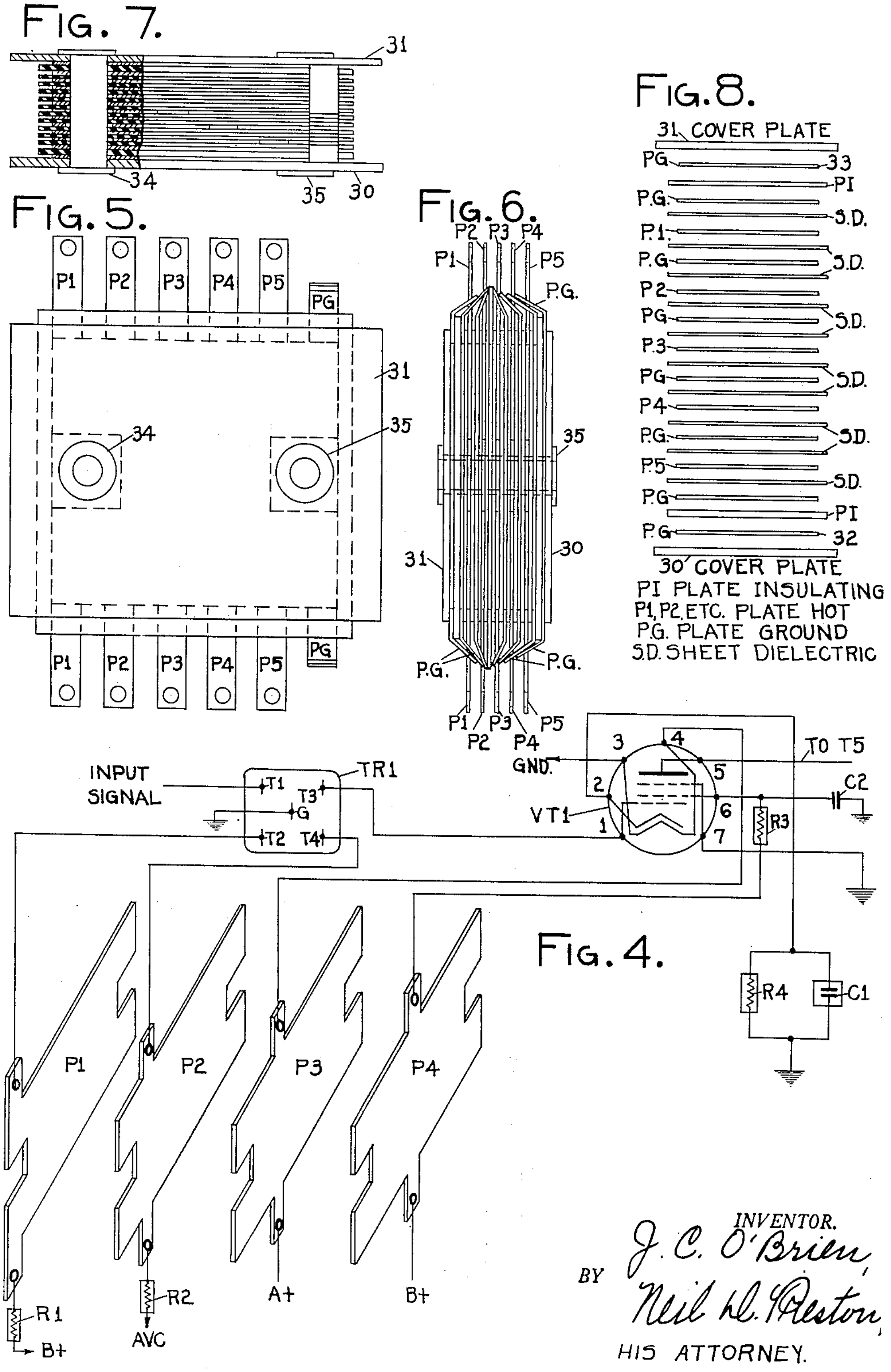
Fig. 4 is an exploded view showing several conductor plates of the by-pass condenser and illustrates the circuit connections from a radio tube and an intermediate frequency transformer to these conductor plates.

Figs. 5, 6, and 7 illustrate the various views of an assembly of five by-pass condensers;

Fig. 8 illustrates, in an exploded view, one arrangement of conductor plates and sheets of dielectric material employed in an assembly of five by-pass condensers;

Figs. 9A and 9B illustrate, respectively, the actual and equivalent circuit diagrams of a conventional by-pass condenser assembly; and Figs. 10A and 10B illustrate, respectively, the actual and equivalent circuit diagrams of a feed-through condenser assembly of which the present invention is a type.

Although this invention is readily adaptable to various types of radio stages, one particular embodiment employing two stages, of intermediate-frequency amplification has been chosen. The amplifier stages illustrated in Fig. 1 are of the conventional type and are familiar to the art so that a detailed explanation of the mode of operation of these stages is deemed unnecessary and it is considered sufficient to point out the uses of by-pass condensers in such a typical circuit organization.

With reference to Fig. 1, the heaters of tubes VT1 and VT2 are shown as receiving direct current from an A battery with by-pass condensers P3 and P7 connected from one heater terminal of each tube to ground so as to prevent currents of high frequency from appearing in the source of heater current and thus being fed to other stages. It will be noted that by-pass condensers of this particular type are diagrammatically represented by the particular symbol such as that associated with the reference character P1 in Fig. 1, for reasons which will later become clear. The dashed line blocks designated by reference characters TR1 and TR2 comprise a coupling transformer and associated condensers which are usually incorporated into a single container known as an "I. F. can." Five terminals are brought out of each of these cans, one for each terminal of each transformer winding and one ground terminal common to both transformers. The lower terminal of each transformer winding is connected to a by-pass condenser as, for instance, in Fig. 1 terminals T2 and T4 are connected, respectively, to by-pass condensers P1 and P2. Likewise, the screen grids of both tubes VT1 and VT2 are connected through screen dropping resistors R3 and R4, respectively, to by-pass condensers P4 and P8.

Figs. 5, 6 and 7 illustrate diagrammatically top, side and front views of a complete by-pass condenser assembly. Each "hot" plate (so named because it conducts the electrical energy) such as P1, P2, etc., is provided with two tabs located directly opposite each other on two sides of the plate and each tab has a small hole drilled through it to facilitate the making of electrical connections thereto. On succeeding plates the projecting tabs are progressively located along the edges of the plate so that when the plates are placed in juxtaposition, the tabs are not directly in line but are separated and, therefore, readily accessible.

On the other two sides of each "hot" plate there is a hole to allow the passage of eyelet 34 and 35 through the stacking of plates so as to hold the plates together. This hole is made relatively large with respect to the eyelet employed so that the various "hot" plates will not touch the fastening element and thereby be shorted one to another.

It is readily obvious from Fig. 5 that, although five "hot" plates are shown, actually only three differently shaped plates are required for, if plate P2 is reversed, it is obviously identical to plate P5 and, likewise, when plate P3 is reversed, it is identical with plate P4. Thus, only three different shapes of "hot" plates are required to achieve the desired degree of spread of the five tab locations.

Fig. 8 illustrates diagrammatically an exploded view of a complete by-pass condenser assembly. Beginning with any "hot" plate and going in either direction one encounters, consecutively, a sheet of dielectric material and then a ground plate. The manner in which this arrangement of "hot" plates, ground plates, and sheets of dielectric comprise a by-pass condenser can best be illustrated by referring to a specific circuit organization employing such a by-pass condenser. Thus, reference to Fig. 1 illustrates the manner in which (B+) voltage is applied to an element of a radio tube as, for instance, the screen grid of tube VT1 and indicates the use of a by-pass condenser in order to by-pass radio frequencies from the source of (B+) potential.

Fig. 4, which illustrates diagrammatically an exploded view of a portion of the condenser assembly shown in Fig. 5, shows clearly how connections are made to the various plates of the by-pass condensers. Thus, in order to apply (B+) potential to the screen grid of tube VT1, Fig. 4 illustrates the manner in which (B+) is applied to the lower tab of "hot" plate P4 and how a connection is then made from the upper tab of this plate P4, through screen-dropping resistor R3, to the screen grid of tube VT1. The fact that the (B+) potential passes directly through one plate of the by-pass condenser directly accounts for the particular representation employed for such a by-pass condenser as exemplified by condenser plate P4 of Fig. 1 and is also the reason why this particular type of by-pass condenser is known as a feed-through condenser.

Each "hot" plate of the by-pass condenser organization acts not only as a conductor of electrical energy but also presents a small amount of inductance from one tab to the other. The way in which this small amount of inductance aids in attenuating radio-frequency currents can be readily understood by referring to Figs. 9A, 9B, 10A and 10B. Fig. 9A represents diagrammatically the circuit arrangement for a conventional by-pass condenser and Fig. 9B represents an equivalent circuit corresponding to the circuit arrangement of Fig. 9A in which equivalent circuit the inductance present in electrical connections 10, 11, 12 and 13 of Fig. 9A is denoted by the windings $10^1$, $11^1$, $12^1$ and $13^1$, respectively.

Fig. 10A, however, represents a by-pass condenser organization of the present invention and Fig. 10B illustrates the equivalent circuit corresponding to the circuit diagram of Fig. 9A. In Fig. 10B inductances $14^1$ and $16^1$ refer to the small amounts of inductance appearing in the corresponding leads 14 and 16 of Fig. 10A. Radio-frequency currents passing through the "hot" plate 15 encounter, for each small increment of inductance such as 15A, 15B, and 15C presented by the "hot" plate, a small increment of capacitance as represented by the condensers C6A, C6B, and C6C of Fig. 10B. Because these increments of inductance and capacitance are infinitely small only a few representative sections have been shown as there are, of course, an infinite number of such sections. Because "hot" plate 15 acts as a conductor of (B+) potential from the (B+) source to the screen grid of a radio tube, there is no physical connection in the by-pass path in Fig. 10A corresponding to the electrical connection 12 of Fig. 9A and there is, therefore, no inductance appearing in the by-pass of the equivalent circuit in Fig. 10B corresponding to inductance $12^1$ of Fig. 9B. Also, since the other plate of the condenser of the present invention shown in Fig. 10A is practically at ground potential there is, similarly, only a slight amount of B inductance in the by-pass path of Fig. 10B corresponding to inductance $13^1$ of Fig. 9B.

Even without the added advantage of eliminating the inductive effect of electrical connections in the by-pass path of the condenser assembly of the present invention, this condenser assembly is far more effective in preventing feed back than is the conventional by-pass condenser because, as is well known to the art, a filter organization of the type shown in Fig. 10B is, because it is composed of an infinite number of individual filter sections, a far better attenuator of radio frequencies than is the filter arrangement of Fig. 9B in which the inductance and capacitance of the filter are lumped into a single section.

An essential feature of the present invention, in addition to its improved radio frequency by-pass characteristics is that, because of its particular design, it provides a compact arrangement providing a multiplicity of by-pass condensers with a minimum of parts and also that it may be so arranged with respect to other circuit elements as to greatly facilitate in making connections from these elements to the tabs of the various "hot" plates. Thus, Figs. 2 and 3 illustrate diagrammatically a typical arrangement of by-pass condensers comprising two condenser assemblies 21 and 22, radio tubes VT1 and VT2, and I. F. "cans" TR1 and TR2 which also appear in the circuit diagram of Fig. 1.

Figs. 2 and 3 illustrate the manner in which these condenser assemblies as, for instance, condenser assembly 22 is held in place on the mounting plate 20 by bolts 36 and 37 which pass through the holes within the eyelets holding the elements of the assembly together. This plate 20 is, in turn, fastened to chassis 23 by means of rivets 24 and 25. In the particular embodiment shown in Figs. 2 and 3, the condenser assembly has been mounted below chassis 23 and the tubes on top so that connections from the tube prongs, which protrude below the chassis, to the condenser tabs, are greatly facilitated.

It should be noted that on each outside surface of the stacking of plates and sheets of dielectric material as shown in Fig. 8, an additional insulating plate, ground plate, and cover plate have been provided. The purpose of the insulating plates is to provide additional spacing between the hot plates and the cover plates. This is important as it is frequently desirable to bend the tabs on the hot plates forward so that the connections to the tabs may more easily be made.

The additional ground plates interposed between each cover plate and insulating plate provide an effective means for grounding all of the ground plates. Assuming that the condenser assembly were so mounted that cover plate 30 in Fig. 8 would be in contact with the mounting plate 20 of Fig. 3, it is obvious that the ground plates, which all are inter-connected by bending their tabs together as previously described, would then be electrically connected over the entire area of ground plate 32 and cover plate 30 to the mounting plate and would thus be effectively grounded. The other cover plate 31 would then be electrically connected to the ground plate 33 throughout the entire area of these plates so that this cover plate would also be effectively grounded. It is apparent that if these additional ground plates 32 and 33 were not provided the cover plate 31 and all of the remaining ground plates would be electrically connected to the mounting plate only through the eyelets 34 and 35 which hold the condenser assembly together. This would be an ineffective connection and would greatly reduce the high-frequency attenuation of this feed-through condenser assembly.

An essential feature of the condenser assembly of the present invention is that the shape of the condenser assembly, although comprising a multiplicity of by-pass condensers, is of such a form as to require a minimum of space. Thus, in Figs. 2 and 3 the condenser assembly has been shown mounted in a vertical position, adjacent to the I. F. "cans" TR1 and TR2 and the radio tubes to which connections are made. In radio receiving systems, for example, it is usually required to provide a relatively large number of by-pass condensers and any economy of space, as is provided by the condenser assembly of the present invention, is greatly instrumental in reducing the over-all volume of such a radio receiving system.

When more than one condenser assembly is mounted upon the same mounting plate, the flow of radio-frequency currents in the same direction through the various plates of the condenser assemblies may cause some undesired magnetic coupling through the mounting plate 20 between various stages and thus cause feed-back. In the present invention a slot has been cut in mounting plate 22 at the location 26. The presence of this slot in the mounting plate effectively isolates the radio-frequency currents of one condenser assembly from the currents in the other condenser assemblies mounted on the same mounting plate and thus greatly reduces the possibility of undesirable feed back. It is to be understood that in the event more by-pass condenser assemblies are required, the length of the mounting plate 22 may be extended so that more condenser assemblies may be mounted thereon. Slots, similar to the one at the location 26 may, of course, be provided in the mounting plate between each successive pair of such additional condenser assemblies.

Thus, the by-pass condenser assembly of the present invention, in addition to providing an extremely effective organization for by-passing radio frequencies, also requires a minimum of space. In addition, this condenser assembly may be manufactured at low cost because of the simplicity of the parts required and because the relatively small number of different parts employed requires a minimum number of expensive dies used to stamp out the various plates.

The particular arrangement and construction of parts shown and described represents only one embodiment of the present invention for one specific application; and it should be understood that various adaptations and modifications may be made in the structure illustrated without in any way departing from the scope of the present invention.

What I claim is:

1. A plurality of by-pass condensers of the feed-through type constituting a single assembly and comprising, a plurality of "hot" plates of an electrically conducting material, each of said "hot" plates provided with two tabs located opposite each other on two sides of said "hot" plates and so positioned that when said "hot" plates are stacked together said tabs are progressively located along said stacking of plates; a plurality of ground plates also made of an electrically conducting material and each provided with two tabs all located at the same relative position on opposite sides of said ground plates and with said ground plates interposed between the various "hot" plates so that there is a ground plate adjacent each face of each "hot" plate, said tabs on each side of said ground plates all being connected together; sheets of a dielectric material interposed throughout the stacking so that there is a sheet of dielectric material between each "hot" plate and each ground plate; an insulating plate, an additional ground plate, and a cover plate located on each outside surface of said stacking in the order named; and means attached between said two cover plates for compressing said assembly.

2. In a radio structure, a chassis having tube elements located thereon, an electrically grounded mounting plate located beneath said chassis and at right angles thereto, said mounting plate being attached to said chassis along its base and having slots at spaced intervals to provide a plurality of electrically isolated mounting portions with respect to radio frequency eddy currents, by-pass condenser assemblies of the feed-through type located on said mounting plate, one on each of said mounting portions and each comprising a stacking of a plurality of thin metallic plates each being separated from its adjacent plate by a thin sheet of dielectric material, said plates and said dielectric sheets being of rectangular shape and each metallic sheet having connector tabs on opposite sides thereof, said tabs for said metallic plates being progressively located along the condenser assembly to allow individual connections to be made thereto at spaced intervals, said tabs on each by-pass condenser assembly along one of its sides being located directly beneath said chassis and closely adjacent said tube elements, whereby the various connections between said tube elements and the condenser assemblies may be made at spaced intervals to reduce the inter-capacity between such connections.

JOHN C. O'BRIEN.

REFERENCES CITED

The following references are of record in the file of this patent:

UNITED STATES PATENTS

| Number | Name | Date |
|---|---|---|
| 1,999,137 | Flewelling | Apr. 23, 1935 |
| 2,334,660 | Webster | Nov. 16, 1943 |
| 2,427,563 | Lavoie | Sept. 16, 1947 |
| 2,473,240 | Byrne | June 14, 1949 |

FOREIGN PATENTS

| Number | Country | Date |
|---|---|---|
| 559,877 | Great Britain | Mar. 8, 1944 |